United States Patent [19]

McMahon et al.

[11] 4,181,399
[45] Jan. 1, 1980

[54] OPTICAL INTERNAL REFLECTANCE SWITCHABLE COUPLER

[75] Inventors: Donald H. McMahon, Carlisle, Mass.; Arthur R. Nelson, Troutville, Va.

[73] Assignee: Sperry Rand Corporation, New York, N.Y.

[21] Appl. No.: 866,888

[22] Filed: Jan. 3, 1978

[51] Int. Cl.² .............................................. G02B 5/14
[52] U.S. Cl. ............................ 350/96.14; 350/96.13; 350/355
[58] Field of Search ............... 350/96.12, 96.13, 96.14, 350/355, 356

[56] References Cited

U.S. PATENT DOCUMENTS

| | | | |
|---|---|---|---|
| 3,695,745 | 10/1972 | Furukawa | 350/96.14 |
| 3,795,433 | 3/1974 | Channin | 350/96.14 |
| 3,877,781 | 4/1975 | Kaminow | 350/96.14 |
| 3,990,775 | 11/1976 | Kaminow et al. | 350/96.14 |
| 4,070,092 | 1/1978 | Burns | 350/96.14 |

OTHER PUBLICATIONS

Burns et al., "Optical Modal Evolution 3–dB Coupler," *Applied Optics*, vol. 15, No. 4, Apr. 1976, pp. 1053–1065.
Soref et al., "Multimode Achromatic Electro-Optic Waveguide Switch ...," *Applied Physics Letters*, vol. 28, No. 12, Jun. 1976, pp. 716–718.

*Primary Examiner*—John K. Corbin
*Assistant Examiner*—John D. Lee
*Attorney, Agent, or Firm*—Howard P. Terry; Seymour Levine

[57] ABSTRACT

An apparatus is described for multimode electro-optic switching with reduced switching voltages. A main optical channel is formed by providing a guiding electrode on an electro-optic substrate which is bounded on either side by barrier electrodes to which voltages are applied that possess polarities opposite to the polarity of the voltage applied to the guiding electrode. Quadratic behavior of Snell's law at glancing incidence is utilized to produce, via voltage excitation, a relatively large change in critical angle over a short section of barrier electrodes, which comprises a coupling region, to allow some portion of the guided light energy to couple from the main channel to a similar branch channel positioned in a coupling relationship thereto. Since the polarity of the barrier electrode is opposite to that of the guiding electrode, the guiding voltage is significantly reduced from that required by the prior art. By designing the coupling elements to produce voltage dependent barriers lying parallel to the main channel guiding electrodes, the required switching voltages are reduced to a minimum.

6 Claims, 5 Drawing Figures

OPTICAL INTERNAL REFLECTANCE SWITCHABLE COUPLER

BACKGROUND OF THE INVENTION

1. Field of the Invention

This invention relates to optical waveguide couplers and more particularly to switchable optical couplers.

2. Description of the Prior Art

Electro-optic materials such as $LiTaO_3$ and $LiNbO_3$ have been employed to provide induced optical waveguides such as those disclosed in U.S. Pat. Nos. 3,695,745 and 3,795,433. These optical waveguides are formed by the realization of a refractive index change caused by applying a voltage to electrodes positioned on the electro-optic material (substrate) to increase the refractive index between the electrodes relative to the refractive index external thereto. At times the voltage required approaches the breakdown voltage of the substrate and a tenuous operating safety factor exists. An alternative configuration uses pairs of electrodes positioned on either side of the desired channel to which the voltages applied decrease the refractive index between the electrodes relative to that within the desired guiding channel. This configuration, however, may also require voltages near the breakdown voltage of the substrate.

Switchable couplers existing in the prior art with the exception of the coupler described by Soref et al in *Applied Physics Letters*, Volume 28, No. 12 on page 716 all operate with single mode radiation only, such as the coupler described by Burns et al in *Applied Physics*, Volume 15, on page 1053. These single mode couplers are interferometric in nature and must be manufactured to strict tolerances and operated within a narrow range of voltages. Soref et al disclose a coupler wherein properly positioned electrodes are deposited on a substrate with a gap therebetween to establish a main channel and a branch channel. A voltage is applied to the main channel electrodes across the thickness of the substrate in a manner to induce a refractive index increase to form a light waveguide between the main channel electrodes. With a reverse voltage or no voltage applied to the branch electrodes, light energy theoretically does not couple to the branch channel. When a voltage that is of equal amplitude and of the same polarity to that coupled to the main channel electrodes is applied to the branch channel electrodes, the light energy propagating in the main channel is caused to divide between the two channels. To effectuate the desired optical waveguides and switching, relatively high voltages must be utilized and switched. This limits the rapidity with which optical energy may be transferred from the main channel to the branch channel and may also exhibit erratic operation if the required voltages approach the breakdown voltage of the substrate.

SUMMARY OF THE INVENTION

The principle of internal reflection at grazing incident angle is utilized for a preferred optical waveguide which includes three electrodes evaporated on one surface of an electro-optic crystal and three electrodes in registration therewith evaporated on the other surface. A positive voltage is coupled to the center or guiding electrode causing an increase in the refractive index of the crystal therebetween and a voltage of substantially equal magnitude but of opposite polarity is coupled to the outer or barrier electrodes causing a decrease in the refractive index of the crystal between the barrier electrodes. These refractive index changes are accomplished with voltages that may be of one-half the magnitude of voltages required to establish optical waveguides described in the prior art. An optical coupler may be created with a triple strip configuration by breaking one barrier wall of the main optical waveguide for a length over which optical coupling is desired, extending the barrier walls on either side of the coupling region to form the barrier walls of the branch optical waveguide and providing a branch guiding electrode between the extended barrier electrodes that extends from the coupling region to form an optical waveguide similar to the main optical waveguide. This optical coupler may be modified to provide an optical switch by elelctrically decoupling the guiding electrode in the main and branch optical waveguide and applying a voltage between the guiding electrodes of the branch waveguide that is of substantially equal amplitude and the same polarity as that applied to the guiding electrodes of the main waveguide when coupling is desired and a voltage that is of substantially equal amplitude and opposite polarity when isolation is desired. A modification of this design provides a pair of electrodes positioned in the coupling region that are electrically isolated from the barrier and the guiding electrodes of the main and branch optical waveguides. In this arrangement, coupling is realized between the two waveguides whenever the voltage applied between the isolated electrodes is substantially equal in amplitude and of the same polarity as the voltages applied to the guiding electrodes of the main and branch waveguides, while isolation is realized whenever the voltage is substantially equal in amplitude and of the same polarity as the voltage applied to the barrier electrodes.

DESCRIPTION OF THE PREFERRED EMBODIMENTS

Figure 1:
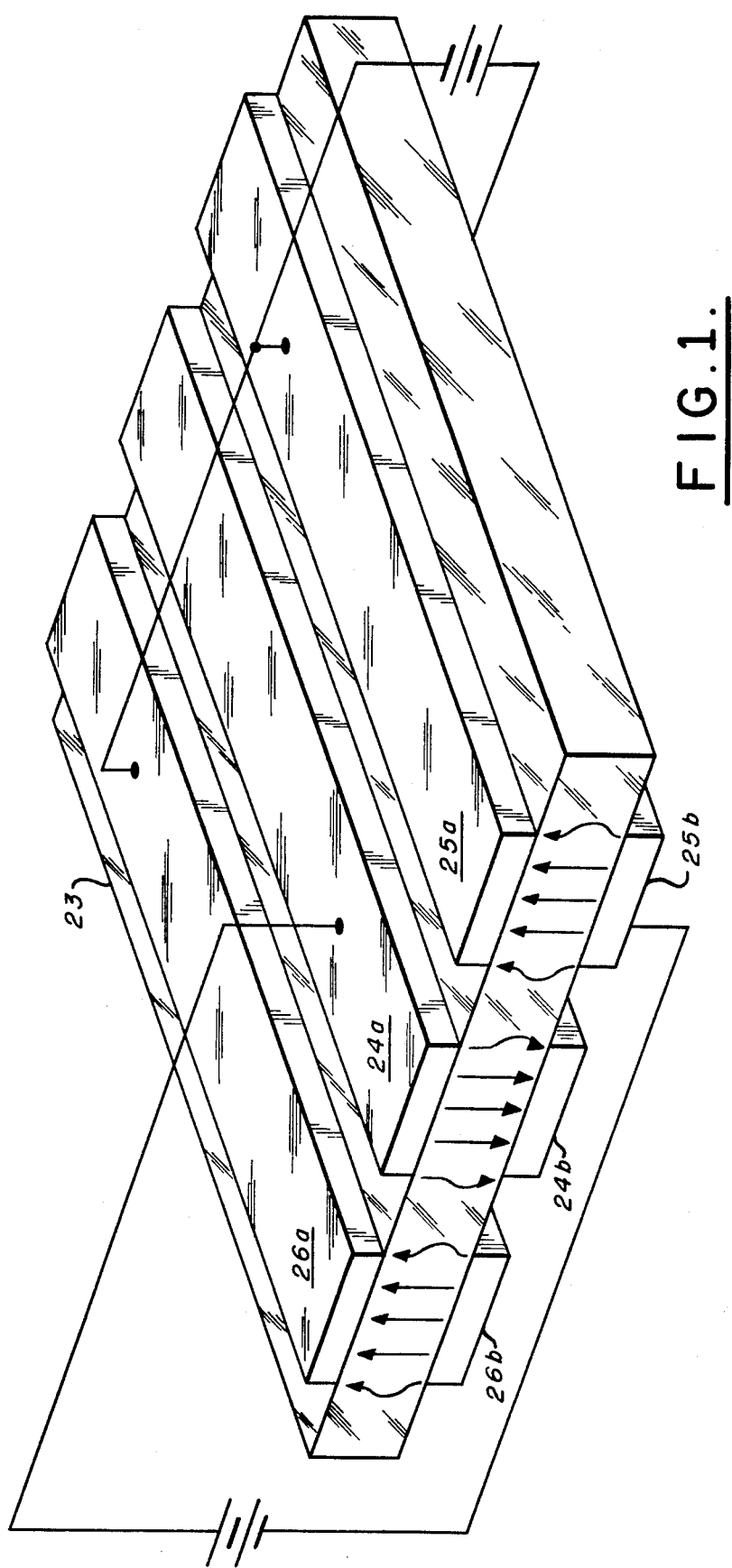
FIG. 1 is an illustration of an optical waveguide employing guiding and barrier electrodes.

Referring to FIG. 1, there is shown an electro-optic guiding structure 20 which includes a substrate of electro-optic material 23, guiding electrodes (24a,24b) deposited on either surface of the substrate 23 and barrier electrodes (25a,25b) and (26a,26b) deposited on either surface of the substrate 23 on either side of the guiding electrodes (24a,24b). Though the electrode patterns are described above as identical on both surfaces of the substrate, it will be apparent to those skilled in the art that a patternless electrode may be employed to substantially cover one entire surface while the electrode pattern on the other, which is shown on both surfaces in FIG. 1 and described above, can be formed on the opposing surface to achieve substantially the same over-all result. Guiding electrodes (24a,24b) are coupled to a voltage source for applying a voltage across the substrate 23 to increase the index of refraction of the substrate therebetween. Electrode pairs (25a,25b) and (26a,26b) are each coupled to a voltage source which may be of an amplitude equal to the amplitude of the voltage coupled between electrodes (24a,24b) but of opposite polarity for applying a voltage across the substrate 23 so as to reduce the refractive index between the electrodes (25a,25b) and the electrodes (26a,26b). This decrease in refractive index is substantially equal to the increase in the refractive index between the guiding electrodes (24a,24b). Thus, twice the change in index of refraction between the guiding channel and boundary is realized for a given applied voltage. In this manner, an optical guiding structure may be induced in an electro-optic material with voltages of amplitudes that are one-half that which would be required if the optical guiding channel were to be induced with a single pair of electrodes.

Figure 2:
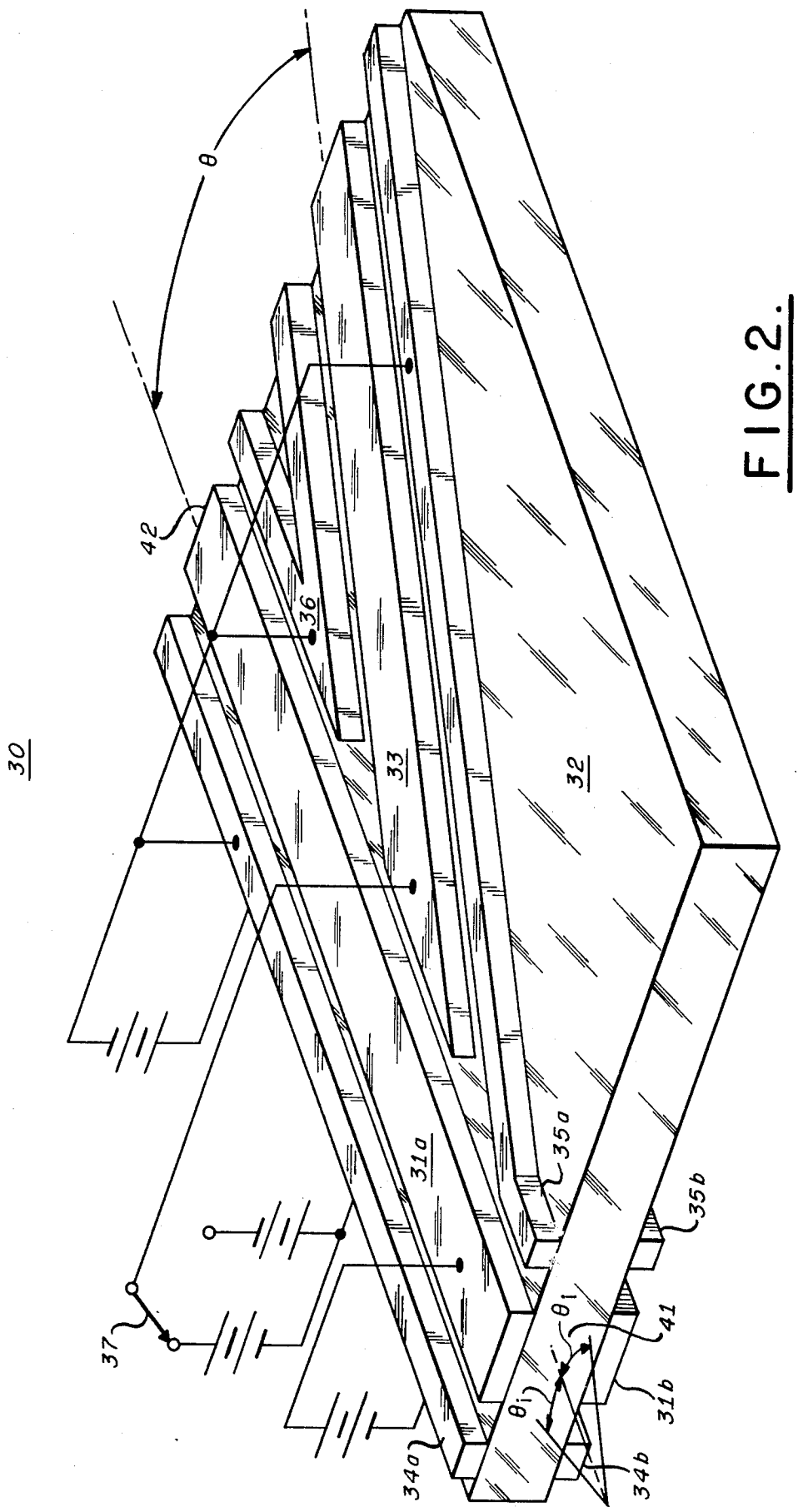
FIG. 2 is an illustration of an optical coupler utilizing guiding and barrier electrodes.

An important feature of the present invention lies in the electro-optic formation of optical waveguides with reduced applied voltages. This feature may be employed to provide an efficient optical waveguide switch such as the switchable branch guide coupler 30 shown in FIG. 2. The switchable coupler 30 includes main guide electrodes (31a,31b) deposited in substantial registration on either side of an electro-optic substrate 32. Branch guide electrode 33, the mating electrode of which is not shown in the figure, is similarly deposited on substrate 32, in electrical isolation from the main guide electrodes (31a,31b) and extends along the substrate 32 from a coupling area at an angle $\theta$ with respect to the main electrodes (31a,31b). Also deposited in substantial registration on substrate 32 are barrier electrodes (34a,34b), (35a,35b) and 36, the mating electrode of which is not shown in the figure. Barrier electrodes (35a,35b) and 36 result from the removal of the segment in the coupling area of the barrier electrode which forms the third strip of a triple strip optical waveguide and extending the remaining segments of the barrier so broken along the substrate from the coupling area at an angle $\theta$ with respect to the main guide electrodes (31a,31b). These extensions of the broken barrier electrode serve as the barrier electrodes for the branch optical waveguide. An optical waveguide is formed within the substrate by internal reflectance when a voltage V is applied across the substrate via electrodes (31a and 31b) and a voltage $-V$ is applied across the substrate 32 via electrodes (34a,34b), (35a,35b) and 36. With the switch 37 positioned for applying a voltage across the substrate 32 via electrodes 33 of equal phase and amplitude to that applied across the substrate via electrodes (31a,31a), an optical branch guide coupler is established wherein a portion of the optical energy incident to port 41 of the optical waveguide formed between electrodes (31a,31b) is coupled to the optical waveguide formed between electrodes 33 with the optical energy not so coupled continuing to propagate along the optical waveguide formed between electrodes (31a,31b). When the switch 37 is positioned to couple a voltage $-V$ across the substrate 32 via electrodes 33, the portion of the electrodes 33 is the coupling region form a segment of the barrier electrodes for the optical waveguide formed between electrodes (31a,31b), thus coupling substantially all the optical energy incident to port 41 to port 42 of the main optical waveguide.

When a voltage of the same polarity and amplitude is applied between electrodes 33 as that applied between electrodes (31a,31b), only part of the light from the main optical channel incident at port 41 enters the branch channel. The remainder continues to propagate along the main optical channel. This configuration, however, produces the largest differential transmission for the least excitation voltage by minimizing the angle between the barrier boundary and the light rays incident thereto from the main optical channel and represents a compromise between high isolation, simplicity of structure and increased voltage sensitivity versus the coupling coefficient between the main and branch optical waveguides.

Figure 3:
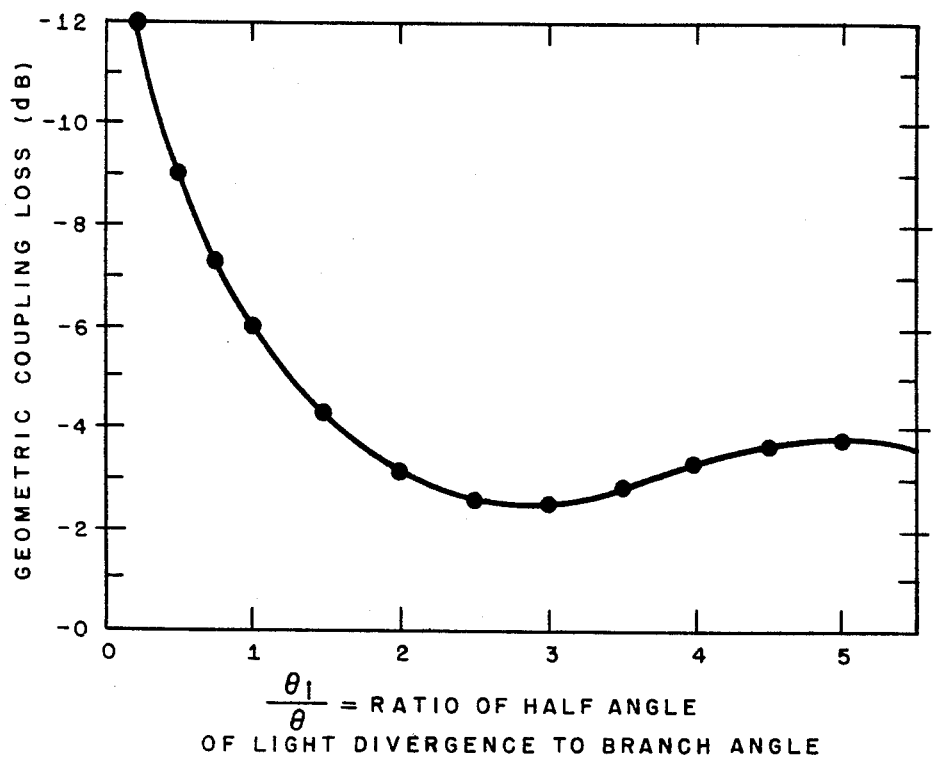
FIG. 3 is a graphical presentation of the variation of the geometric coupling factor between two similar optical waveguides as the angle therebetween varies.
Figure 4:
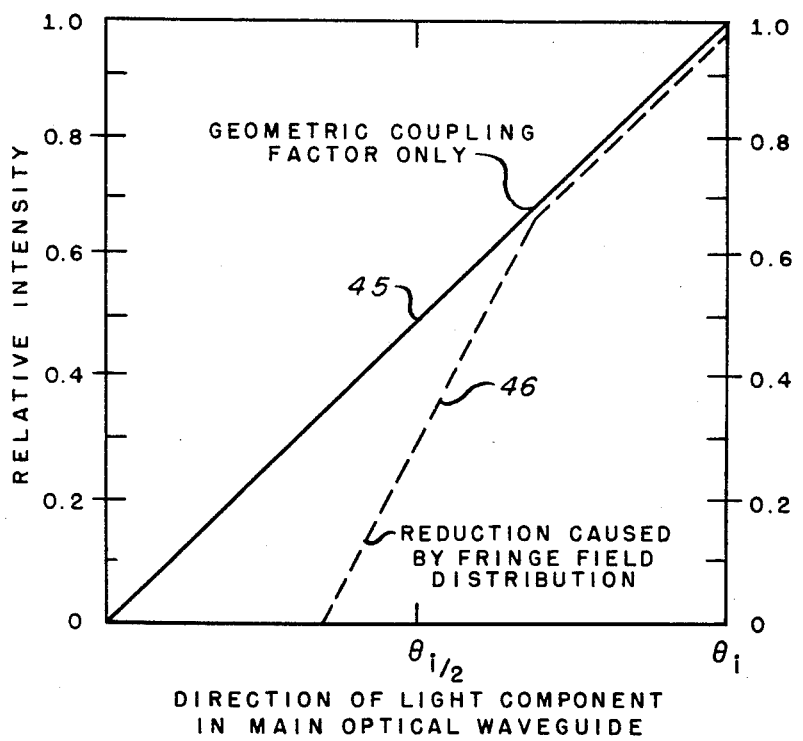
FIG. 4 is a graphical presentation of the relative intensity of optical mode energy coupled to the branch guide of a 3 dB optical coupler.

The coupling loss between the main optical waveguide and the branch optical waveguide can be decomposed into two parts; geometric factor and an electric fringe field factor. With the switch structure 30 in the ON state, the structure shown in FIG. 2 may be considered to be a three port structure having sharp walls. In this situation, ray tracking techniques may be employed to determine the coupling loss. A graph of the coupling loss versus the ratio of one-half the incident beam width, $\theta_i$, to the angle, $\theta$, subtended by the branch optical channel to the main optical channel is shown in FIG. 3. It is to be noted that the coupling loss decreases to a minimum value of $-2.3$ dB when $\theta_i$ is between $2\theta$ and $3\theta$. For many applications, however, it may be desirable to select the coupling geometry such that $\theta_i=2\theta$. For this configuration, the range of angles propagating in the output channel is minimized since only light propagating at angles between 0 and $\theta_i$ can enter a channel inclined at angle $\theta$ if $\theta=\frac{1}{2}\theta_i$. As a result thereof, the range of angles which propagate in the branch channel 33 is $\pm\theta_i/2$ relative to $\theta$. When $\theta_i$ is equal to $2\theta$, the geometric coupling ratio is 3 dB, for which the relative intensity of all light components coupled into the branch channel having ray directions between 0 and $\theta_i$ relative to the central channel is shown by the solid line 45 in FIG. 4. A second loss factor is introduced when the electric field in the crystal contained in the fringe field regions between the main guide electrodes (31a,31b) and the branch guide electrodes 33 is lower than the electric field between the main guide electrodes (31a, 31b). In this case, the index distribution through the main line cross-section governs, at each point, the minimum angle relative to the main guide which is passed through the branch guide. Thus, with the index of refraction at a given point along this line decreased by $\Delta n$ from the main index, all light components which subtend an angle that is less than $\theta_c$ will be reflected, $\theta_c{}^2$ being equal to $2\Delta n/n$, which is a consequence of Snell's law when $\Delta n<<1$. By breaking the mid line section into small increments of distance and calculating the critical angle at each point, it can be shown that this decrease in refractive index causes the angular distribution of light entering the branch guide to decrease to the dotted line distribution 46 shown in FIG. 4. Integrating the two functions shown in FIG. 4 reveals that the fringe field distribution introduces an additional coupling loss of $-1.2$ dB. This fringe field loss, however, can be readily reduced by applying a slightly higher excitation voltage to the branch guide electrodes 33 than that applied to the main guide electrodes (31a,31b).

Figure 5:
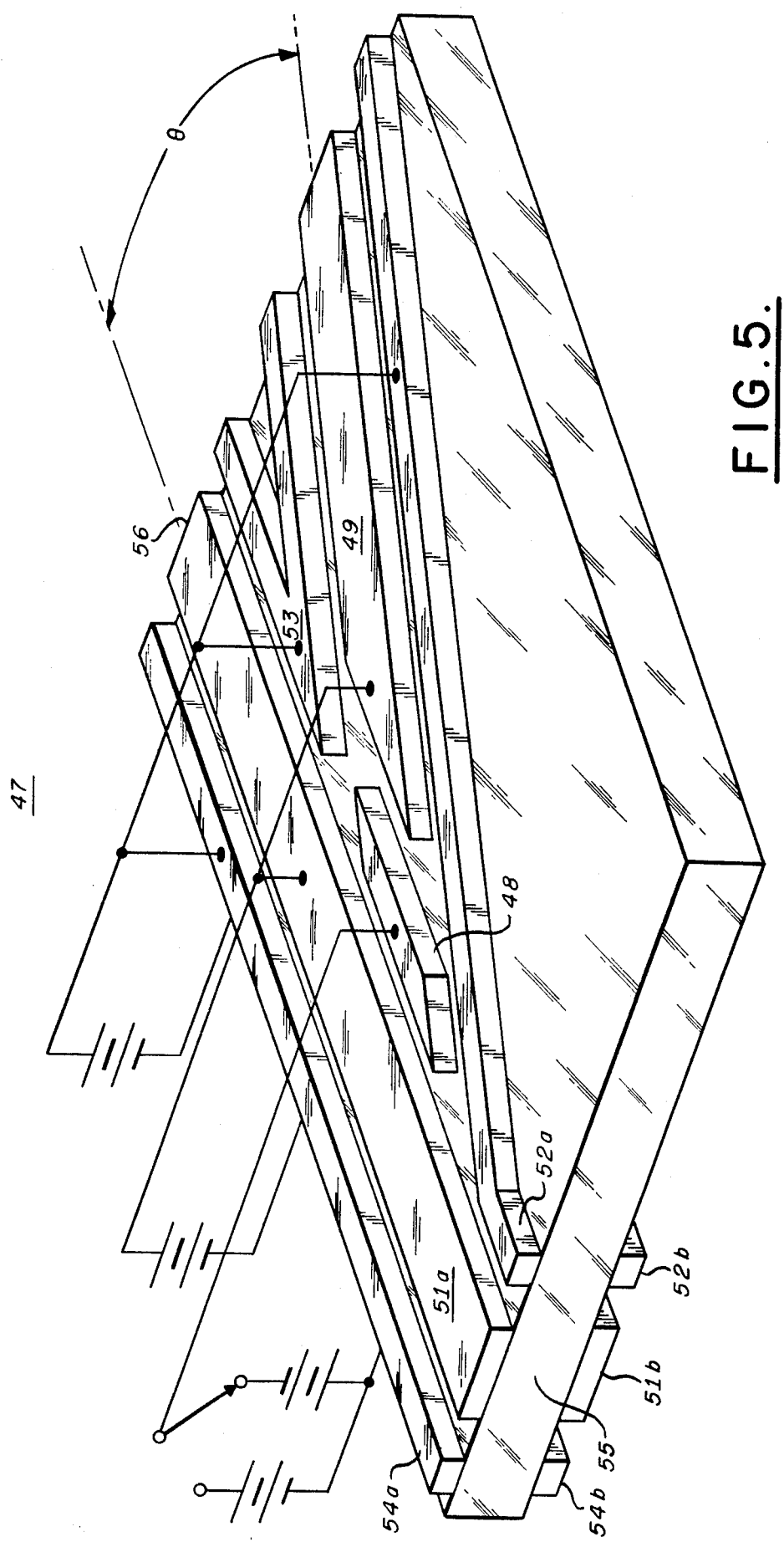
FIG. 5 is an illustration of another optical coupler switch.

Refer now to FIG. 5 wherein a coupler switch 47 is shown that minimizes switching capacitance. Coupling electrodes 48 are interposed between the branch guiding electrodes 49 and the main guiding electrodes (51a,51b). Coupling electrodes 48 may be segments of the barrier electrodes for the main optical guiding channel between the guiding electrodes (51a,51b) and are arranged in-line within electrical isolation from the portion of the electrodes (52a,52b) and 53, which form the remaining segments of these barrier electrodes. The remaining portions of electrodes (52a,52b) and 53 are extended parallel to the branch guided electrodes 49 to form the barrier electrodes for the branch optical guide. The electrodes (52a,52b), 53, and (54a,54b), which form the other barrier for the main optical guide, are coupled to a voltage of an amplitude and polarity which reduces the refractive index of the portion of the substrate located respectively between these electrodes. Electrodes 49 and (51a,51b) are coupled to a voltage of amplitude and polarity which increases the refractive index of the portion of the substrate located respectively between theses electrodes. When electrodes 48 are coupled to a voltage of amplitude and polarity that reduces the refractive index of the substrate therebetween, a substantially continuous barrier for the main optical guide is performed and the switch is in the "OFF" state whereby optical signals propagate between ports 55 and 56 with substantially no coupling loss. Switching the voltage coupled to electrodes 48 to an amplitude and polarity to increase the refractive index therebetween creates a substantially continuous branch optical guide which extends from the coupling region along the main optical waveguide between the barrier electrodes (52a,52b) and 53, thus establishing a device similar to that shown in FIG. 3 when it is in the "ON" state condition. By increasing the voltage applied to switching electrodes 48 slightly above the voltage applied to guiding electrodes (51a,51b) and 49, the additional loss factor depicted by the dotted line 46 in FIG. 4 may be eliminated.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A light guiding apparatus comprising:
    a substrate of substantially transparent electrooptic material with index of refraction $n_0$ having first and second major surfaces;
    first and second electrode pairs positioned on said first and second major surfaces with one electrode of each pair on said first major surface and the other electrode of each pair on said second major surface, said electrode pairs outlining first and second predefined areas between said first and second major surfaces;
    a third electrode pair positioned on said first and second major surfaces with one electrode on each of said major surfaces, said third electrode pair outlining a third predefined area between said first and second major surfaces, said third predefined area being interposed between said first and second predefined areas;
    means for applying a first voltage with a predetermined polarity across said substrate through said first and second electrode pairs, the application of said first voltage causing a refractive index $n_1$ that is less than $n_0$ in the predefined areas outlined by said first and second electrode pairs as long as said first voltage is applied across said substrate; and
    means for applying a second voltage with a polarity opposite said predetermined polarity across said substrate through said third electrode pair, the application of said second voltage causing a refractive index $n_2$ that is greater than $n_0$ in the predefined area outlined by said third electrode pair as long as said second voltage is applied across said substrate, the application of said first and second voltages creating a main optical guiding channel in the predefined area outlined by said third electrode pair between said predefined areas outlined by said first and second electrode pairs.

2. A light guiding apparatus in accordance with claim 1 wherein:
    one electrode pair of said first and second electrode pairs extends on said first and second surfaces from a first position to a first predetermined location at which a coupling area along said interposed region commences and therefrom at a preselected angle with respect to said third electrode pair and extends from a second position towards said first position to a second predetermined location at which said coupling area terminates and therefrom at said preselected angle with respect to said third electrode pair, the refractive index of said substrate in the areas outlined by said electrode extensions caused to be $n_1$ when said first voltage is applied to said first and second electrode pairs; and
    further including a fourth pair of electrodes one electrode of which is formed on said first surface and the other electrode on said second surface, said electrodes being interposed between said extensions of said one electrode pair of said first and second electrode pairs on the respective surfaces of said substrate and extending substantially from said coupling area at substantially said preselected angle with respect to said electrodes of said third electrode pair, said extensions of said one electrode pair and said fourth electrode pair interposed therebetween defining a branch light guiding channel;
    means for applying a third voltage across said substrate through said fourth electrode pair, the application of said third voltage with a polarity opposite to said predetermined polarity causing said refractive index $n_2$ in the area outlined by said fourth pair of electrodes thereby coupling said branch light guiding channel to said main optical guiding channel and the application of said third voltage with said predetermined polarity causing the refractive index $n_1$ in the area outlined by said fourth pair of electrodes thereby causing optical signals propagating within said main optical guiding channel to continue to propagate therein with substantially no coupling between said main and said branch optical guiding channels.

3. A light guiding apparatus in accordance with claim 2 wherein said fourth electrode pair extending substantially from said coupling area comprises a first section electrode pair, one electrode of which is formed on said first major surface of said substrate and the other on said second major surface thereof and a second section electrode pair, one electrode of which is positioned on said first major surface of said substrate and the other on said second major surface thereof, each positioned between electrodes of said first section electrode pair and electrodes of said third electrode pair;
    means for applying said second voltage across said substrate through said first section electrodes, the application of said second voltage causing said refractive index $n_2$ in the area outlined by said first section electrodes; and means for switchably applying said first and second voltages across said substrate through said second section electrodes, the application of said first voltage causing said refractive index $n_1$ in the area outlined by said second section electrodes thereby substantially creating a barrier between said first and second sections and substantially decoupling said branch light-guiding channel from said main light guiding channel and the application of said second voltage causing said refractive index $n_2$ in the area outlined by said second section electrodes, thereby permitting light coupling between said main light guiding channel and said branch light guiding channel.

4. A light guiding apparatus in accordance with claim 1 wherein:

said first and second electrode pairs each comprise an electrode positioned on said first major surface and an electrode positioned substantially over the entire area of said second major surface thereof, said electrode of said first and second electrode pairs on said first major surface outlining said first and second predefined areas;

said third electrode pair outlining said predefined area interposed between said first and second predefined areas comprises an electrode positioned on said first major surface and said electrode positioned substantially over said area of said second major surface.

5. A light guiding apparatus in accordance with claim 4 wherein:

one of said first and second electrodes positioned on said first major surface extends thereon from a first position to a first predetermined location at which a coupling area along said interposed region commences and therefrom at a preselected angle with respect to said electrode of said third electrode pair on said first major surface and extends from a second position towards said first position to a second predetermined location at which said coupling area terminates and therefrom at said preselected angle with respect to said electrode of said third electrode pair, the refractive index of said substrate in the areas outlined by said electrode extensions caused to be $n_1$ when said first voltage is applied to said first and second electrode pairs; and further including an electrode positioned on said first major surface interposed between said extensions of said one electrode and extending substantially from said coupling area at substantially said preselected angle with respect to said third electrode, said extensions of said one electrode and said electrode interposed therebetween defining a branch light guiding channel; and means for applying a third voltage across said substrate through said interposed electrode of said branch channel and said electrode formed substantially over said second major surface, the application of said third voltage with a polarity opposite to said predetermined polarity causing said refractive index $n_2$ in the area outlined by said electrode interposed between said extensions of said one electrode thereby coupling said branch light guiding channel to said main optical guiding channel and the application of said third voltage with said predetermined polarity causing said refractive index $n_1$ in the area outlined by said electrode interposed between said extensions of said one electrode thereby causing optical signals propagating within said main optical guiding channel to continue to propagate therein with substantially no coupling between said main and said branch optical guiding channels.

6. A light guiding apparatus in accordance with claim 5 wherein said electrode interposed between said extensions of said one electrode extending substantially from said coupling area comprises a first section electrode positioned on said first major surface and a second section electrode positioned on said first major surface between said first section electrode and said third electrode;

means for applying said second voltage across said substrate through said first section electrode and said electrode positioned substantially over the entire area of said second major surface, the application of said second voltage causing said refractive index $n_2$ in the area outlined by said first section electrode; and means for switchably applying said first and second voltages across said substrate through said second section electrode and said electrode positioned substantially over the entire area of said second major surface, the application of said first voltage causing said refractive index $n_1$ in the area outlined by said second section electrode thereby substantially creating a barrier between said first and second sections and substantially decoupling said branch light guiding channel from said main light guiding channel and the application of said second voltage causing said refractive index $n_2$ in the area outlined by said second section electrode, thereby permitting light coupling between said main light guiding channel and said branch light guiding channel.

* * * * *